US011371188B2

(12) United States Patent
Kinnunen-Raudaskoski et al.

(10) Patent No.: US 11,371,188 B2
(45) Date of Patent: Jun. 28, 2022

(54) METHOD OF PRODUCING A FIBROUS PRODUCT AND A FIBROUS PRODUCT

(71) Applicant: Paptic Oy, Espoo (FI)

(72) Inventors: Karita Kinnunen-Raudaskoski, Espoo (FI); Marja Juvonen, Espoo (FI); Esa Torniainen, Espoo (FI); Martin Häggblom, Espoo (FI); Tuomas Mustonen, Espoo (FI)

(73) Assignee: Paptic Oy, Espoo (FI)

( * ) Notice: Subject to any disclaimer, the term of this patent is extended or adjusted under 35 U.S.C. 154(b) by 0 days.

(21) Appl. No.: 16/959,159

(22) PCT Filed: Dec. 31, 2018

(86) PCT No.: PCT/FI2018/050987
§ 371 (c)(1),
(2) Date: Jun. 30, 2020

(87) PCT Pub. No.: WO2019/129934
PCT Pub. Date: Jul. 4, 2019

(65) Prior Publication Data
US 2020/0331231 A1 Oct. 22, 2020

(30) Foreign Application Priority Data

Dec. 31, 2017 (FI) .................... 20176206

(51) Int. Cl.
D21H 17/34 (2006.01)
D21F 11/00 (2006.01)
D21H 13/32 (2006.01)
D21H 13/40 (2006.01)
D21H 17/20 (2006.01)
D21H 17/37 (2006.01)
D21H 13/30 (2006.01)
D21H 13/38 (2006.01)
D21H 17/33 (2006.01)

(52) U.S. Cl.
CPC ........... *D21H 17/34* (2013.01); *D21F 11/002* (2013.01); *D21H 13/30* (2013.01); *D21H 13/32* (2013.01); *D21H 13/38* (2013.01); *D21H 13/40* (2013.01); *D21H 17/20* (2013.01); *D21H 17/33* (2013.01); *D21H 17/37* (2013.01)

(58) Field of Classification Search
CPC .. B32B 5/245; B32B 5/18; B32B 5/32; B32B 7/12; D21H 13/30; D21H 17/34; D21H 17/20; D21H 13/38; D21H 13/40; D21H 17/37; D21H 17/33; D21H 13/32; D21F 11/002

USPC ......................................... 162/216
See application file for complete search history.

(56) References Cited

U.S. PATENT DOCUMENTS

| 4,597,831 A | 7/1986 | Anderson |
| 5,904,809 A * | 5/1999 | Rokman ................... D21F 1/08 162/101 |
| 6,238,518 B1 | 5/2001 | Rokman |
| 6,921,459 B2 * | 7/2005 | Kinsley, Jr. ........... D21F 11/002 162/101 |
| 9,103,056 B2 | 8/2015 | Evers Smith et al. |
| 10,259,151 B2 * | 4/2019 | Kiiskinen ............. B29C 44/022 |
| 2005/0039870 A1 * | 2/2005 | Blomqvist ............ D21F 11/002 162/336 |
| 2010/0059190 A1 | 3/2010 | Katajamäki et al. |
| 2016/0221233 A1 | 8/2016 | Kiiskinen et al. |

FOREIGN PATENT DOCUMENTS

| CA | 2647745 A1 | 10/2007 |
| CN | 107250458 A | 10/2017 |
| EP | 0195458 B1 | 9/1988 |
| EP | 1461494 B1 | 9/2004 |
| JP | 2008266825 A | 11/2008 |
| WO | WO9314267 A1 | 7/1993 |
| WO | WO9602702 A1 | 2/1996 |
| WO | WO03040469 A1 | 5/2003 |
| WO | WO2013144449 A1 | 10/2013 |
| WO | WO2013160564 A1 | 10/2013 |
| WO | WO-2015036659 A1 * | 3/2015 ............. D21H 21/24 |
| WO | WO2015181281 A1 | 12/2015 |
| WO | WO2016083667 A1 | 6/2016 |
| WO | WO2017162927 A1 | 9/2017 |
| WO | WO2017203101 A1 | 11/2017 |

OTHER PUBLICATIONS

GHOSH: Fundamentals of paper drying—Theory and application from industrial perspective. Intech Open Access Publisher, Sep. 12, 2011. p. 537.

* cited by examiner

*Primary Examiner* — Mark Halpern
(74) *Attorney, Agent, or Firm* — Laine IP Oy

(57) ABSTRACT

The present invention relates to multi-layer fiber products and a method of manufacturing these kinds of products. The present product comprises a first layer consists mainly of natural fibers and a second, heat-sealing layer located on top of the first layer. The heat-sealing layer consists mainly of synthetic thermoplastic fibers or particles. According to the present method, the heat-sealing layer is brought onto the first layer already during the web forming process, the first and the second layers being formed and joined together in a foam forming process. With the present invention, it is possible to decrease the amount of plastic materials in packaging materials having heat-sealing properties.

19 Claims, 3 Drawing Sheets

METHOD OF PRODUCING A FIBROUS PRODUCT AND A FIBROUS PRODUCT

This application is a 371 of PCT/FI2018/050987 filed on 31 Dec. 2018

FIELD OF THE INVENTION

The present invention relates to a method according to the preamble of claim 1 of manufacturing a fiber product.

In a method of the present kind, a base layer comprising mainly natural fibers is formed in a web forming process and a heat-sealing layer is brought onto the base layer in order to prepare a multi-layer fiber product.

The present invention also relates to a fiber product according to claim 20 and a use according to claim 26.

DESCRIPTION OF RELATED ART

Consumers today demand increasingly environmentally friendly packaging solutions. For this reason, for many retail chains and brand owners paper and paperboard are preferred packaging materials because such products are obtained from renewable raw materials and are readily recycled. Many packages that require for example good barrier properties against oxygen, water and greases are provided with layers of materials that have heat-sealing properties. For this reason, paper-plastic laminates are frequently used for packing candies and bakery products, such laminates being manufactured by extrusion coating of paper or by laminating paper together with plastic films by using cold or hot glue.

Due to the bonding of extrusion films to paper or paperboard substrates or to a required increase in the strength of the laminated film, the proportion of plastics in these film laminates is often tens of percent, and therefore the materials are difficult to pulp, and recycling is frequently based on heat recovery by combustion. For example, in the extrusion coating of paper the minimum thickness of plastic film is usually about 15 um, since a film thinner than the indicated thickness makes it difficult to obtain sufficient adhesion of the film to the paper.

On the other hand, by lamination it is difficult to attach films which have a thickness less than 20 um, as the film must be self-supporting in the lamination process.

FI 126474 B discloses a product comprising a natural fiber matrix, into which thermoplastic fibers can be incorporated as reinforcing fibers, thus conferring heat sealing properties of the product. However, the amount of such reinforcing fibers mixed to the matrix must be relatively high in order to provide good enough heat-sealability.

For example due to the above mentioned short-comings of the present conversions processes and materials, the current heat-sealing paper materials comprise relatively large amount of plastics which impairs recycling of the materials. In addition, the manufacturing of such materials requires in principle one or more extra process steps, which increases the costs.

Further, heat-sealing products based on plastic films are not breathable. However, many packaged products, for example powdery products, require breathability from the package due to the effectiveness of the packaging line. For many products, such as textiles and furniture, aeration or ventilation during storage and transport is desirable. Bakery products, such as bread, benefit from breathable packages because that will shorten delivery times by eliminating the need for cooling of the products before packaging.

SUMMARY OF THE INVENTION

It is an aim of the present invention to eliminate at least some of the problems associated with the art and to provide a new type of heat-sealing product and a method to manufacture a heat-sealing fiber product.

In particular, it is an aim to improve the recyclability of heat-sealing paper-type materials by reducing the amount of thermoplastic materials incorporated into the products and by increasing the cost-effectiveness of the manufacture of recyclable packaging materials.

A further object of the present invention is to provide a method by which novel heat-sealing and air permeable end products can be produced.

According to the present invention, onto a substrate layer, mainly comprises natural fibers, is formed a heat-sealing layer comprising mainly synthetic fibers or particles, especially long synthetic fibers.

It has been found in the invention, that such a separate heat-sealing fiber layer enables a considerably much thinner total layer thickness and thus a smaller total amount of synthetic material. On the other hand, by the invention materials are provided which can be joined with a heat-seal that is typically stronger than that obtained for conventional extrusion coated or laminated films and also a stronger heat-seal than that obtained for products where the same amount of synthetic fibers or particles is evenly incorporated into the base layer.

In the method according to the present invention, a layer, in particular a heat-sealing layer, is brought onto the substrate layer already at the web forming step, whereby the heat-sealing fiber layer is strongly attached to the substrate layer without the need for any entirely separate process steps or lines.

According to the present invention, preferably at least one of the layers, in particular at least one substrate layer or at least one heat-sealing layer, or both, are formed by foam forming.

More specifically, the method according to the present invention is mainly characterized by what is stated in the characterizing part of claim 1.

The product according to the present invention is, in turn, characterized by what is stated in the characterizing part of claim 20.

The use according to the present invention is defined in claim 26.

Considerable advantages are obtained by means of the present invention.

In particular, by means of the invention it is possible significantly to reduce the proportion of plastic of the novel materials with up to 75%, compared to paper-plastic laminates commonly used as packaging materials. This is due to the fact that a fiber or particle rich heat-sealing layer can be produced as a very thin structure which attaches at the web forming step firmly to the substrate layer of the product. Thus, the invention enables the manufacture of multi-layer materials that are easier to recycle. Since the invention removes one separate refining process from the production chain, the invention also allows a manufacture of cost-effective heat-sealing materials.

Further, compared to existing plastic imitating products in which synthetic thermoplastic fibers have been mixed evenly to the whole fiber matrix, the heat-seals according to the present invention have been found to be up to 60% stronger with the same starting materials and total amount of material. This enables the use of even smaller amounts of plastic materials, thus enabling easier recycling of materials and yet the manufacturing of strong seams, which is essentially important in the packaging industry.

Compared to products manufactured by lamination or extrusion coating methods, an advantage is obtained that the product is breathable, since in addition to the base layer the heat-sealing layer of the fiber structure may be implemented as breathable structure as well, unlike self-contained films.

Preferably, both the base layer and the heat-sealing layer are formed and attached to each other in the foam forming process when the dry-matter content of the product is still low, for example 35% or less. The seal of the layers can be strengthened by adding a binder to the layers or at least to their interface zone. The used binder is preferably heat-sealable itself when the need of synthetic fiber material further decreases. On the other hand, a sufficiently strong interconnection can be ensured by calendaring in a sufficient pressure and temperature.

The thickness of the heat-sealing layer is typically considerably smaller than the one of the base layer, heat-sealing layer having a grammage of 15 g/m$^2$ or less, preferably 10 g/m$^2$ or less, more preferably 5 g/m$^2$ or less.

An absolute thickness of the heat-sealing layer is preferably 10 um or less, for example 2-10 um, which is significantly less than what is possible to obtain in conventional heat-sealing products.

In the following, the preferred embodiments of the present invention will be examined more closely on the basis of the companying drawings.

EMBODIMENTS

Figure 1A:
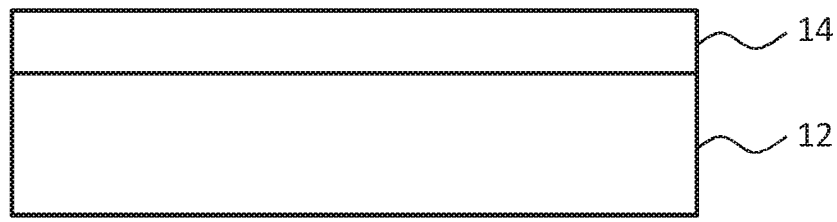
FIG. 1A shows a cross-sectional view of the structure of a double layer multi-layer fiber product according to one embodiment of the present invention.

The term "layer consisting mainly of X" (or "mainly comprises") in the present context means that said layer comprises at least 50 weight-% of material X.

The term "heat-sealing" refers to a structure and material which is capable of forming a permanent seal under the influence or heat and pressure at least with another similar structure and material.

The terms "web forming process" and "forming" stand for the formation of weblike fiber-based structure by a wet-laid process where raw materials contained in the final product are introduced onto the wire in the form of an aqueous slush or a foam, they are shaped or formed into a fibrous web which is dried in a drying section of a paper or paperboard machine to provide the final fibrous matrix. By "foam forming" is meant in particular the method as disclosed in FI126474.

The term "long" when used for synthetic fibers generally means fibers having a length of at least 1 mm.

The term "multilayered web" of "multilayered fibrous product" stands for a web or fibrous product that is formed by at least two overlapping layers of fibers. There can be a plurality of such overlapping layers, typically 2 to 10, in particular 2 or 3. Preferably, at least one of layers forming the surface of the multilayered web or product is formed by a heat-sealing layer. In one embodiment, the layer adjacent to the heat-sealing layer is a substrate layer which typically does not have heat-sealing properties by itself. In addition to the fibrous layers there can be also a surface layer conferring preselected properties, for example of hydrophobicity, to the layered products.

The "fiber lengths" of "average fiber lengths" are expressed in terms of length weighted average. Length weighted average fiber length is calculated as the sum of individual fiber lengths squared divided by the sum of the individual fiber lengths.

As will appear from the above, in the manufacture method of a preferred embodiment, the heat-sealing layer of a paper material is brought onto the product already at the manufacturing stage to provide a multilayered product. Such a multilayered fibrous product it typically composed of a first layer, for example a base layer, mainly comprising natural fibers, such as chemical pulp, mechanical pulp, semimechanical pulp, recycled fibers or any combination of these, and a second layer, i.e. the heat-sealing layer, which mainly comprises synthetic fibers, particles or combinations thereof, that is formed onto the first layer in the web forming process.

In one embodiment, a method of manufacturing a multilayered fibrous product which comprises at least two overlapping layers is achieved in a web forming process, in particular by foam formation. In the embodiment
- a first layer containing mainly of natural fibers is provided, and
- a second layer containing synthetic fibers or particles provided, the first and the second layers being arranged in overlapping relationship. The second layer is capable of conferring properties of heat-sealing to the fibrous product.

In one embodiment,
- the first layer is formed into a web from a first slush having a first composition, and
- the second layer is applied onto the web formed by the first layer from a second slush having a second composition to form a multilayered web.

The first and the second compositions differ from each other for example with regard to the content of at least one component selected from fibers, polymers, additives and water.

Preferably at least one, in particular both of the compositions contain foaming agents.

In one embodiment, the first and the second layers are formed and joined together in a foam forming process using a multilayer headbox.

According to one embodiment, the present multi-layer fiber product is manufactured using foam forming technology at least for the production of the base layer, and preferably also for the production of the heat-sealing layer and interconnecting of the layers. In general, the technology is described in publications FI 126474 B and FI 126092 B. The foam forming enables even distribution of long synthetic fibers also in thin layers, and thus a high quality end product.

In one embodiment, foam forming of the present multilayer product is carried out using a single forming unit to which the foam streams are fed in layers or in sections.

The forming unit can be horizontal or vertical. For example, in a two-layered web, one foam stream forms the base web. The dry-matter of that stream comprises mainly natural fibers. The other forming layer which forms the sealing layer comprises mainly thermoplastic fibers.

Generally, by foam forming high consistency of the furnish (high dry matter content of the slush) can be maintained. Typically, in the present technology, the consistency in the headbox is greater than 0.1% by weight, in particular greater than 0.5% by weight and up to about 3% by weight.

In a preferred embodiment, a part of the starting material is first formed into a water-containing, planar base web which comprises a first water phase and a first fiber phase mainly comprising natural fibers. In particular, the web is formed by foam forming, as described below by dispersing the fibers in a foam or a foamble liquid of water and at least one foaming agent. The heat-sealing layer is attached to the base web as a partial web or as a dispersion, in particular as a foamed partial web or as a foamed dispersion, comprising a second water phase and a second fiber or particle phase mainly comprising synthetic fibers or particles or combinations thereof, and by allowing the synthetic fibers and any particles of the second fiber phase to infiltrate at least partially between the natural fibers of the first fiber phase.

The resultant moist multilayered web is dried to remove the water, whereby the natural fibers and synthetic fibers form a layered fiber matrix together. In the same connection, one or more binders can be applied to the first and/or second aqueous phase, or over the whole web, whereby also the binder infiltrates to the desired layers. Preferably, the binder is selected so that it is compatible with the fibers and particles of the heat-sealing layer.

Generally, the ratio of the velocity of the foam stream to the velocity of the wire (upon which possible already a first layer of a first slush has been deposited) is in the range of 0.1 to 2.5.

In one embodiment, the ratio is not equal to 1. In that embodiment, there will be a mixing of the layers upon the wire to allow for development of interlayer bonding.

In one embodiment, the ratio is greater than 1 and up to 2.5.

In one embodiment, foam forming comprises forming a foamed dispersion by dispersing fibers in a foam or foamable liquid of water and at least one foaming agent to obtain fiber-foam comprising typically 0.1 to 15%, for example 0.5 to 10% by weight of at least one foaming agent. The thus formed fiber-foam is then conveyed to a foraminous support, such as a wire, and liquid is drained trough the foraminous support to form a sheet.

The foaming agents for producing foams are selected from surface active agents, which enable the formation of a foam. Thus, typically, the foaming agent is selected from water-soluble foaming polymeric agent and water dispersible foaming polymeric agents and combinations thereof. The foaming agent can be selected from water soluble glycans, water dispersible glycans, water soluble hydrophilic polymers and water dispersible hydrophilic polymers and combinations thereof. Preferably the water soluble glycans and water dispersible glycans are selected from polysaccharides and derivatives thereof. The water soluble hydrophilic polymers and water dispersible hydrophilic polymers can also be selected from poly(vinyl alcohol)s and poly(vinyl acetate)s and copolymers thereof.

In one embodiment, where the fibers do not form hydrogen bondings, the foaming chemicals act also as a binder.

In one embodiment, in particular carried out using separate headboxes, it is possible first to dry the layer formed from a first slush from a first headbox to remove a portion, typically a major portion, of the water before a second layer is deposited from a second headbox on the still wet first layer. Thus, in one embodiment, a first layer is formed into a web having a first solids content, the web is subjected to drying to increase the solids content of the web to provide a modified web having a second solids content (second dry matter content), and a second layer is applied onto the modified web.

Similarly, in particularly using separate headboxes:

a first layer is formed into a web having a first solids content, the web is subjected to pressing in a press section, to cylinder drying in cylinder section or to a combination thereof, in order to increase the solids content of the web to provide a modified web having a second solids content (second dry matter content), and a second layer is applied onto the modified web.

The first layer has initially a high water content, on the order of that of the first water composition used for web forming, and it is dried to a higher solids content (dry matter content) so as to form a modified web prior to deposition of the second water composition. For example. The first layer is dried to a second solids content of 15 to 35% by weight, in particular 20 to 35% by weight, to form a modified web before applying the second layer on the web.

In one embodiment, drying of the web and in particular of the multilayered web is carried out by a non-contact drying.

Drying is, for example, carried out by at least one method selected from the group consisting of vacuum drying, hot air drying, through-air-drying, IR drying, cylinder drying and combinations thereof.

Drying is typically carried out until a final moisture content of less than 20% by weight, typically less than 15% by weight, in particular less than 10% by weight is reach.

In one embodiment, the particles (including fibers) of the layers have a size greater than the pore size of the wire. This allows for the use of vacuum for enhancing water removal from the web.

The application of a binder can be carried out onto the partial web or multi-layer web, i.e. separately onto the webs of the base layer web and heat-sealing layer before bonding of these together, or only after the bonding. The structure can be strengthened by applying binder at the interface of the layers, either on one or both partial webs, typically onto their contacting surfaces, before the joining the webs together.

In one embodiment, both the base layer and the heat-sealing layer comprise the same thermoplastic binder, suitably evenly spread upon or in the layers.

The hydrophobic properties of a product as disclosed herein can be further improved. Thus, in one embodiment, on the opposite surface of the heat-sealing layer of the base layer is arranged a layer having hydrophobic properties. One example is a surface-lacquer layer.

Hydrophobic properties can be conferred to a surface layer of the multilayered product by using hydrophobic agents, such as alkylene ketene dimer (AKD), alkenylsuccinic anhydride (ASA) and binders in combination with cross-linking binding agents.

Regarding the fibrous and particulate materials of the layers, it can be noted the following.

In the present context, in particular, the natural fibers are sourced from cellulose or lignocellulose raw materials, for example, by using chemical or semi-chemical pulping or defibering. The fibers can also be mechanical pulp fibers or recycled fibers. Especially, the natural fibers refer to natural fibers and their mixtures described more precisely in publication FI 126474 B.

As raw material of the cellulose or lignocellulose fibers, wood materials or vegetable materials, such as annual or perennial plants can be used. In particular, deciduous tree material (obtained from birch, aspen, poplar, alder, Eucalyptus or mixed tropical hardwood, for example) or, in particular, coniferous tree material is used as a raw-material. Examples of the latter include wood obtained from spruce or pine.

The cellulose or lignocellulose fibers can be refined.

In one embodiment, non-refined cellulose or lignocellulose fibers, in particular cellulose fibers, are employed.

In one embodiment, the base layer (substrate layer) consists mainly of natural fibers. In one embodiment, the base layer (substrate layer) comprises more than 50% by weight and up to 100% by weight, of natural fibers calculated from the total weight of the fibers of the base layer (substrate layer).

In one embodiment, the base layer (substrate layer) may comprise 1-49%, typically about 1 to 30%, for example about 1 to 20% by weight of other fibers, especially synthetic fibers.

Further components, for example binders or other additives, and potentially other components required by the product or the manufacturing process, can also be incorporated. The amount of such components are in general about 0.1 to 30 parts by weight per 100 part by weight of the layer.

Examples of binders include natural binders and biopolymers, such as starch and modified starch and starch derivatives, chitosan, alginates, and synthetic binders, such as vinyl acetate and vinyl acrylate latex and polyurethanes and SB-latexes, as well as mixtures thereof and various copolymers, particularly copolymers of synthetic binder polymers.

The heat-sealing layer may comprise up to 100%, for example 50-100%, such as 51-99%, by weight of thermoplastic fibers and/or particles, such as polylactide (PLA), glycolic acid polymer, polyolefin, polyethylene terephthalate, polyester, polyamide, polyvinyl alcohol or bicomponent (bico) fibers or particles. Particularly, the material may be PLA, polypropylene (PP), polyethylene (PE) or bicomponent fibers. Also other biopolymers, such as polybutylene succinate (PBS), are potential polymers for these synthetic fibers or particles. One of the preferred examples is PLA-PBS multi-layer synthetic fibers or particles. Especially thermoplastic fibers can be biodegradable thermoplastic fibers.

As a raw material of the heat-sealing layer, for example up to about 50% by weight, for example about 0.1 to about less than 50% by weight (for instance 1 to 49% by weight), other fibers, such as long reinforcement fibers, especially viscose, or natural fibers or other than thermoplastic synthetic fibers can also be used. Thus, for example, cellulose or lignocellulose fibers of the above-described kind (and refined or preferably non-refined) can be incorporated into the heat-sealing layer. Typically the amount of such fibers is up to 40% by weight, in particular about 5 to 30% by weight.

The synthetic fibers of the heat-sealing layer may have a linear density of, for example, 10 dtex or less, preferably not more than 5 dtex, such as 1-5 dtex. The average length of the long fibers may be, for example, 1-50 mm, preferably 1-20 mm, such as 3-12 mm. Typical PLA fibers suitable for use have a length mass of 1.7 dtex and a length of 6 to 12 mm.

Binders and/or other additives required by the product or the manufacturing process can also be incorporated. The amount of such components are in general about 0.1 to 30 parts by weight per 100 part by weight of the layer.

Examples of binders include natural binders and biopolymers, such as starch and modified starch and starch derivatives, chitosan, alginates, and synthetic binders, such as vinyl acetate and vinyl acrylate latex and polyurethanes and SB-latexes, as well as mixtures thereof and various copolymers, particularly copolymers of synthetic binder polymers. In one embodiment, binders which are capable of heat-sealing are used. In one embodiment, binders which are capable of conferring properties of elasticity to the heat-sealing layer, such as polyurethanes, are employed.

The interconnection of the layers may be carried out or it may be improved also by heat, for example by calendering the multi-layer web at least at 90° C. and preferably above 130° C.

In one embodiment, the aqueous composition ("first slush") for the first layer contains in addition to natural fibers, and optionally synthetic fibers and/or particles, also 0.1 to 15% by weight, calculated from the solids content, of an additive selected from surfactants, binding agents and combinations thereof.

In one embodiment, the aqueous composition ("second slush") for the second layer contains in addition to synthetic fibers and/or particles, and optionally other fibers, such as natural fibers, also 0.1 to 15% by weight, calculated from the solids content, of an additive selected from surfactants, binding agents and combinations thereof.

As will appear from the above, in one preferred embodiment, the first layer is "non-heat-sealing", i.e. incapable of heat sealing against another similar layer, whereas the second layer is capable of heat sealing against another layer.

Figure 1B:
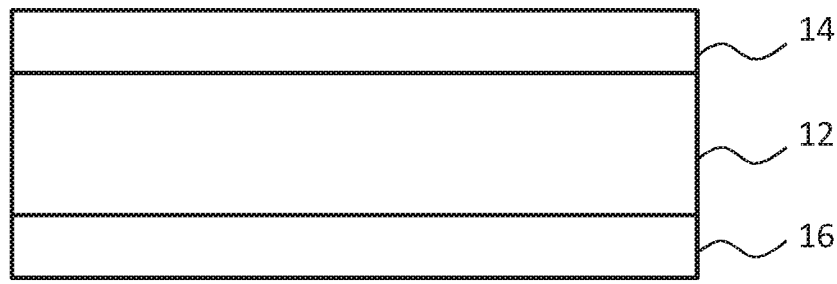
FIG. 1B shows a cross-sectional view of the structure of a three layer multi-layer fiber product according to one embodiment of the present invention.

Turning next to the drawings which illustrate various embodiments more closely, it can be noted that FIG. 1A shows a basic structure with a base layer 12 (which also can be referred to as "substrate layer") and a heat-sealing layer 14 arranged onto the first surface of the base layer. FIG. 1B shows an embodiment in which also onto the second, opposite surface of the base layer is arranged a functional surface layer 16. This second surface layer 16 can be for example a hydrophobic layer in order to provide the final product with properties of both heat-sealing and improved moisture-proofing.

In general, the heat-sealing layer 14 is thinner than the base layer 12. Typically its grammage is 10 g/m$^2$ or less, preferably 1-5 g/m$^2$, such as 2-4 g/m$^2$, with the grammage of the base layer being preferably 20-100 g/m$^2$, for example 30-70 g/m$^2$, in particular 20-60 g/m$^2$ or 20-40 g/m$^2$. In one embodiment, a 70 g/m$^2$ multilayered product (a sheet or web) was produced with a 10 g/m$^2$ heat-sealing layer overlapping a 60 g/m$^2$ fibrous base layer. In another embodiment, a multilayered product having a grammage of 30 g/m$^2$ for the base layer and 3 g/m$^2$ for the heat-sealing layer were produced.

As discussed above, the base layer may contain 50-100%, for example 51-99%, by weight of natural fibers, typically cellulose or lignocellulosic fibers.

In an embodiment, a multilayered structure as shown in the drawings is manufactured by a paper or paperboard machine by using a multilayer headbox configured for foam forming.

Figure 2A:
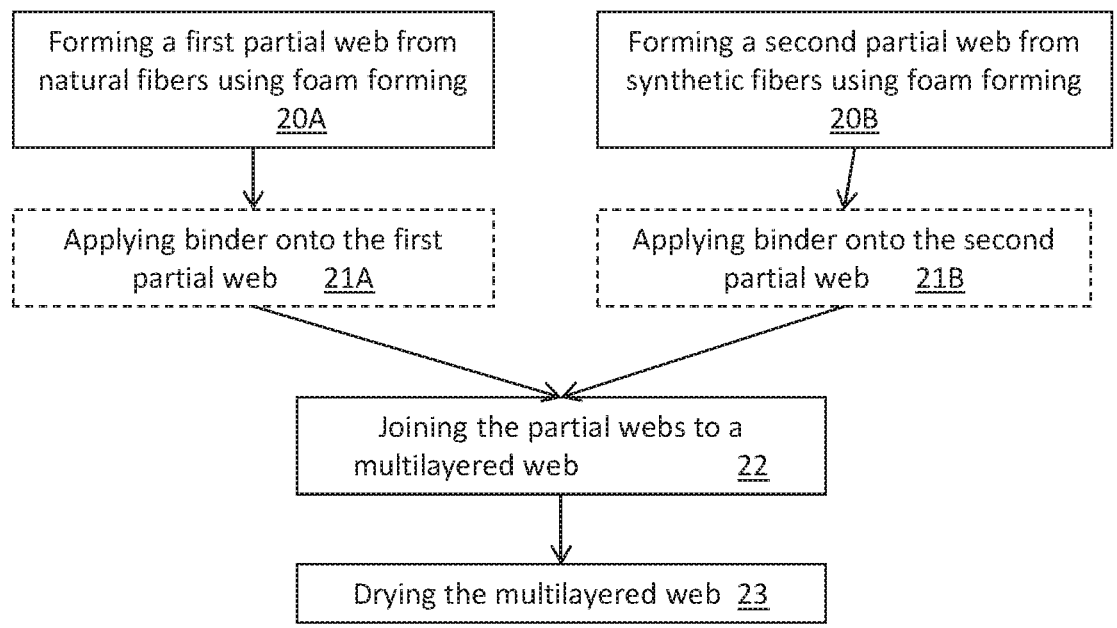
FIGS. 2A and 2B show flow charts of the manufacturing method according to the present invention according to two embodiments of the present invention.

Referring to the FIG. 2A, it can be noted that, according to one embodiment, the partial web forming the base layer and the partial web forming the heat-sealing layer are formed in steps 21A and 21B in a foam forming process from different masses using a multi-layer headbox of a paper machine, after which a multi-layer web is formed from the partial webs in step 22.

The multi-layer web is further dried in step 23 in order to prepare a multi-layer fiber product. Optionally, a binder can be applied to the partial webs in steps 21A and 21B. In addition or optionally, a binder can also be applied to the multi-layer web. The multi-layer web can also be calendered in order to improve the interconnection of the layers.

Figure 2B:
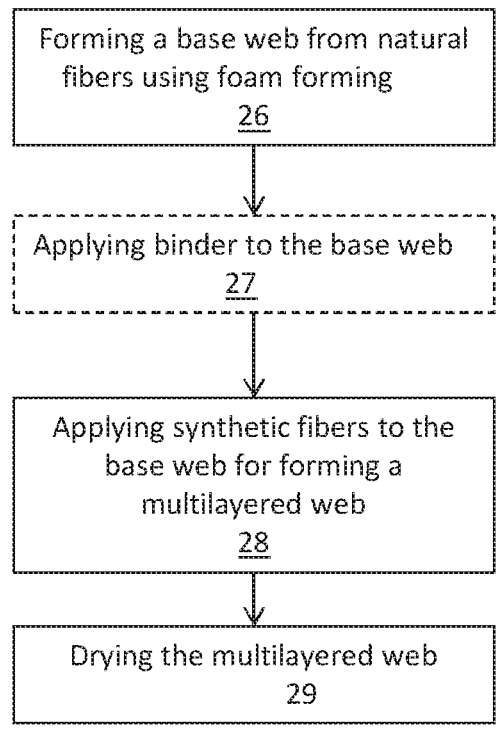

Referring to the FIG. 2B, according to one embodiment, the base web forming the base layer is formed in step 26 by foam forming, after which onto the surface of the web forming the base layer are applied thermoplastic synthetic fibers or particles in step 28, still during the web forming phase, in order to produce a multi-layer web. Before this, also a binder can be applied to the base web in step 27. Finally, the multi-layer web is dried in order to produce a multi-layer fiber product in step 29.

By foam forming, in particular carried out in connection with the web forming, it is possible to adjust the mixing between the different layers in order to achieve the required layer strength.

Figure 1C:
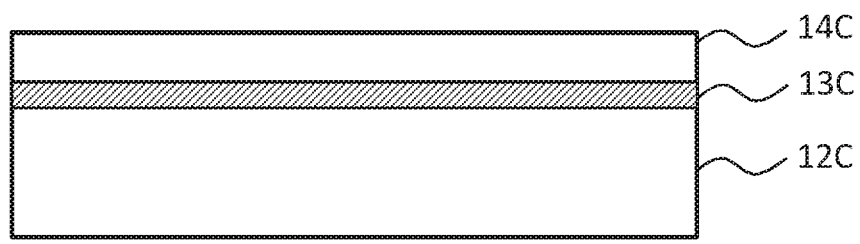
FIG. 1C shows a cross-sectional view of the structure of a multi-layer fiber product according to one embodiment of the present invention, in which structure the base layer and the heat-sealing layer are partially mixed with each other in order to strengthen the bonding between the layers.

According to one embodiment, visualized in the FIG. 1C, the fibers of the base layer 12C and the heat-sealing layer 14C are mixed in the interface zone of the layer such way that the interface of the layers becomes "sliding". The thickness of the interface zone 13C can be for example 5-50% of the thickness of the heat-sealing layer 14C, for example 0.5-3 um. The mixing strengthens the adhesion and thus the entire product and especially the heat-seams produced from the product. A corresponding mixing can also be produced possibly to the other layer interfaces of the product. If necessary, the multi-layer structure can also be produced by foam forming such way that layers are not substantially mixed with each other.

The base layer 12, 12C, is referred at this unit but in general also the base layer may comprise several sublayers. According to one embodiment, the base layer 12, 12C, as well the heat-sealing layer, comprises however substantially a single layer and has a homogeneous fiber composition.

Example 1. The Effect of the Layer Structure on Heat-Sealability

A sheet mold was used to manufacture sheets with a first layer on the wire-side consisting of 100% cellulose fibers and the advance layer, i.e. a heat-sealing layer, consisting of a blend of cellulose fibers and polylactide (PLA) fibers. A binder was applied on the sheet on the side of the first, non-heatsealing layer. The layers were calendered at temperature of 90° C. using one nip and a pressure of 10 bar.

The sheets were seamed using a force of 800 N, at temperature of 210° C. and a heat sealing time of 0.5 s. The strength of the seams were measured with a horizontal traction device using samples strips having a width of 50 mm. The strips were cut from the sheet in the cross direction such way that the seams were orientated in machine direction. The paper strips drawn speed was 20 mm/min and draw gap 100 mm. 3-4 parallel determinations were carried out on each sample.

The same amount of total material were used in samples (1a, 2a, 3a, 4) and reference samples (1b, 2b, 3b), however, such way that in the samples the synthetic fibers were mixed only to the part of the amount of the cellulose fiber. Thus, a layer structure more similar to that described above was generated. In the reference samples the synthetic fibers were evenly mixed with the whole amount of the cellulose fiber.

Figure 3:
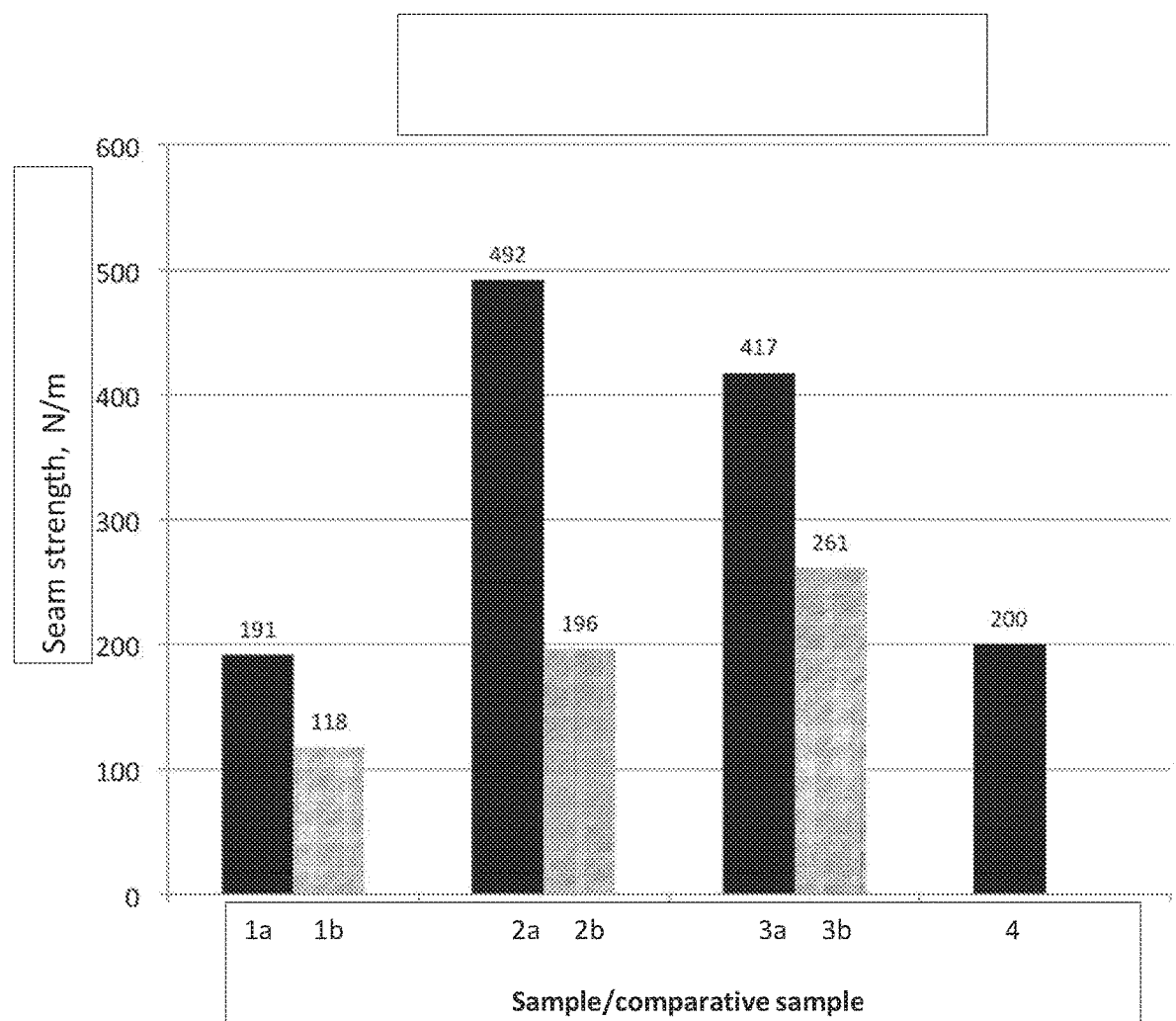
FIG. 3 shows the results of the strength tests described in example 1 as a graph.

Further details on materials and results are shown in Table 1 and FIG. 3.

TABLE 1

Measurement of seam strength

| Sample | Total grammage $g/m^2$ | Pulp fraction to which PLA has been mixed, % | PLA $g/m^2$ | PLA % of total weight | Seam strength N/m | Strength growth % |
|---|---|---|---|---|---|---|
| 1a | 96 | 50 | 15 | 16 | 191 | 62 |
| 1b | 94 | 100 | 15 | 16 | 118 | |
| 2a | 109 | 50 | 30 | 27 | 492 | 151 |
| 2b | 112 | 100 | 30 | 27 | 196 | |
| 3a | 62 | 50 | 15 | 24 | 417 | 60 |
| 3b | 62 | 100 | 15 | 24 | 261 | |
| 4 | 78 | 17 | 5 | 6 | 200 | |

As will appear from the results of the samples (1a, 2a, 3a, 4) and reference samples (1b, 2b, 3b), respectively, the seam strength increased with at least 60% when the synthetic fibers were layered on one side of sheet, compared to a situation where PLA fibers were evenly distributed throughout the entire structure of the sheet.

Sample 4 shows that even a thin (5 $g/m^2$) heat-sealing layer on top of a base layer of natural fibers produces a strong seam. Thus, the present sealing strengths, sufficient for practical applications, can be achieved with the structures described above using significantly smaller amounts of synthetic polymer than when mixing the synthetic polymer evenly into the entire fiber product.

INDUSTRIAL APPLICABILITY

The product according to the present invention can be used for example as a heat-sealing packaging blank or packaging, such as bags or bows, having at least one heat-sealed seam.

REFERENCES

Patent Publications

FI 126474 B
FI 126092 B
FI 63806
EP 0 195 458 B1

The invention claimed is:
1. A method of manufacturing a multilayered fibrous product which comprises at least two overlapping layers, the method comprising:
providing in a web forming process:
a first layer comprising natural fibers, and
a second layer comprising synthetic fibers or particles,
wherein the first and the second layers are formed and joined together by foam forming, said first and said second layers being arranged in overlapping relationship, and said second layer being heat-sealable, and wherein
the first layer is formed into a web from a first slush having a first composition, and
the second layer is applied onto the web formed by first layer from a second slush having a second composition to form a multilayered web, said first composition being different from said second composition.

2. The method according to claim 1, wherein the first and the second layers are formed and joined together in a foam forming process using a multilayer headbox.

3. The method according to claim 1, wherein:
the first layer is formed into a web having a first solids content,
said web is subjected to drying to increase the solids content of the web to provide a modified web having a second solids content, and
the second layer is applied onto the modified web.

4. The method according to claim 3, wherein the modified web comprises a dry matter content of 15 to 35% by weight before the second layer is applied upon the modified web.

5. The method according to claim 3, wherein the second layer is applied onto the modified web in the form of a foam.

6. The method according to any of claim 1, wherein
the first layer is formed into a web having a first solids content,
said web is subjected to pressing in a press section, to cylinder drying in cylinder section, or to a combination thereof, in order to increase the solids content of the web to provide a modified web having a second solids content, and
the second layer is applied onto the modified web.

7. The method according to claim 1, wherein the multi-layered web formed by said first and said second layers is dried in order to produce a multilayered fibrous product.

8. The method according to claim 7, wherein the drying of the multilayered web is carried out by non-contact drying.

9. The method according to claim 1, wherein the first layer is formed from a first slush which contains natural fibers selected from cellulose fibers, lignocellulose fibers, and combinations thereof.

10. The method according to claim 1, wherein the second layer is formed from a second slush which comprises
thermoplastic fibers or particles selected from polyactide, glycolic acid polymer, polyolefin, polyethylene terephthalate, polyester, polyamide, polyvinyl alcohol, polybutylene succinate or bicomponent (bico) fibers or particles, and combinations thereof.

11. The method according to claim 1, wherein the second layer is formed from a second slush which comprises thermoplastic fibers having a linear density of 1-5 dtex, and an average length of 1-50 mm.

12. The method according to claim 1, wherein the first slush further comprises 0.1 to 15% by weight, calculated from the solids content thereof, of an additive selected from surfactants, binding agents and combinations thereof.

13. The method according to claim 1, wherein the second layer is formed from a second slush which, in addition to the synthetic fibers or particles, further comprises 0.1 to 15% by weight, calculated from the solids content, of an additive selected from surfactants, binding agents, and combinations thereof.

14. The method according to claim 1, wherein the first or the second slush or both comprise at least one binder selected from the group consisting of natural binders and biopolymers, synthetic binders, copolymers, thermoplastic binders, and mixtures thereof.

15. The method according to claim 1, wherein the first or the second layer, or both, is impregnated with a binder.

16. The method according to claim 1, wherein the first layer comprises more than 50% and up to 100% by weight, calculated from the total weight of the fibers of the first layer, of natural fibers.

17. The method according to claim 1, wherein the second layer comprises 50-100% by weight, calculated from the total weight of the fibers of the second layer, of thermoplastic fibers and/or particles.

18. The method according to claim 1, wherein the synthetic fibers or particles comprise thermoplastic fibers or particles.

19. The method according to claim 1, wherein the first layer is introduced onto a wire.

* * * * *